United States Patent
Gill, III

(10) Patent No.: US 9,802,525 B2
(45) Date of Patent: Oct. 31, 2017

(54) ROTOR BLADE STANDS

(71) Applicant: The Boeing Company, Chicago, IL (US)

(72) Inventor: Frank Joseph Gill, III, Conshohocken, PA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/057,667

(22) Filed: Mar. 1, 2016

(65) Prior Publication Data

US 2017/0253167 A1    Sep. 7, 2017

(51) Int. Cl.

| | |
|---|---|
| *B60P 3/40* | (2006.01) |
| *A47F 5/12* | (2006.01) |
| *F16M 11/28* | (2006.01) |
| *B60P 3/00* | (2006.01) |
| *B64F 5/00* | (2017.01) |
| *F16M 11/12* | (2006.01) |
| *F16M 11/42* | (2006.01) |
| *F16M 11/04* | (2006.01) |

(52) U.S. Cl.
CPC ...... *B60P 3/00* (2013.01); *B60P 3/40* (2013.01); *B64F 5/0009* (2013.01); *F16M 11/041* (2013.01); *F16M 11/125* (2013.01); *F16M 11/28* (2013.01); *F16M 11/42* (2013.01); *F16M 2200/08* (2013.01)

(58) Field of Classification Search
CPC ... B60P 3/40; B60P 3/00; F03D 1/005; F16M 11/041; F16M 11/125; F16M 11/28; F16M 11/42; F16M 2200/08
USPC ...... 248/674–677, 201, 274.1, 371, 130, 31, 248/139, 471, 477; 410/44, 120, 45; 280/404, 651
See application file for complete search history.

(56) References Cited

U.S. PATENT DOCUMENTS

| 852,864 | A | * | 5/1907 | Wright et al. | ......... F16M 11/00 248/471 |
|---|---|---|---|---|---|
| 5,556,064 | A | * | 9/1996 | Cowe | ...................... F16M 11/24 211/175 |
| 8,056,203 | B2 | * | 11/2011 | Madsen | .................... B60P 3/40 29/407.09 |
| 8,353,523 | B2 | * | 1/2013 | Pedersen | ................... B60P 3/40 280/404 |

(Continued)

OTHER PUBLICATIONS

Onexia Inc., "Rotor Blade Cart—Simplified blade management. No tools, air or power required," onexia.com/aerospace, retrieved from the internet on Mar. 1, 2016, 2 pages.

*Primary Examiner* — Tan Le
(74) *Attorney, Agent, or Firm* — Hanley, Flight & Zimmerman, LLC

(57) ABSTRACT

Example stands for supporting a component, such as a rotor blade, are described herein. An example stand described herein includes a blade support having an opening extending from an edge of the blade support towards a center of the blade support. The opening is to receive a rotor blade of an aircraft, for example. The example stand also includes a base to support the blade support above a supporting surface. The blade support is rotatably coupled to the base about a horizontal axis perpendicular to a central axis of the blade support such that the blade support can tilt the rotor blade relative to the supporting surface.

16 Claims, 7 Drawing Sheets

(56) References Cited

U.S. PATENT DOCUMENTS

| | | | | |
|---|---|---|---|---|
| 8,366,360 | B2* | 2/2013 | Krogh | B60P 3/40 410/44 |
| 8,387,929 | B2* | 3/2013 | Lin | F16M 13/022 248/130 |
| 9,004,843 | B2* | 4/2015 | Lemos | F03D 1/005 410/44 |
| 9,011,054 | B2* | 4/2015 | Thomsen | B60P 3/40 410/120 |
| 9,199,570 | B2* | 12/2015 | Pedersen | B60P 3/40 |
| 2006/0285937 | A1* | 12/2006 | Wobben | B60P 3/40 410/45 |

* cited by examiner

ROTOR BLADE STANDS

GOVERNMENT LICENSE RIGHTS

This invention was made with Government support under Contract No. W58RGZ-04-G-0023 awarded by the United States Army. The Government of the United States may have certain rights in this invention.

FIELD OF THE DISCLOSURE

This disclosure relates generally to stands and, more particularly, to rotor blade stands.

BACKGROUND

During construction, maintenance and transportation of aircraft components, such as a rotor blades, stands are used to hold and support the rotor blades. Known rotor blade stands support the rotor blades in a generally horizontal orientation. To reorient a rotor blade, the rotor blade is lifted by a crane, reoriented, and placed back on the rotor blade stands.

SUMMARY

An example apparatus disclosed herein includes a blade support having an opening extending from an edge of the blade support towards a center of the blade support. The opening is to receive a rotor blade of an aircraft, for example. The example apparatus also includes a base to support the blade support above a supporting surface. The blade support is rotatably coupled to the base about a horizontal axis perpendicular to a central axis of the blade support such that the blade support can tilt the rotor blade relative to the supporting surface.

Another example apparatus disclosed herein includes a base and a blade support pivotably coupled to a base. The blade support includes an opening to receive a rotor blade of an aircraft, for example. The blade support is pivotable between a first position in which a central axis of the blade support is horizontal and a second position in which the central axis is not horizontal.

Yet another example apparatus disclosed herein includes a base and a blade support having an opening extending from an edge of blade support towards a center of the blade support. The opening is to receive an object to be supported by the blade support. The example apparatus also includes means for rotatably coupling the blade support to the base about a horizontal axis perpendicular to a central axis of the blade support.

Figure 1:
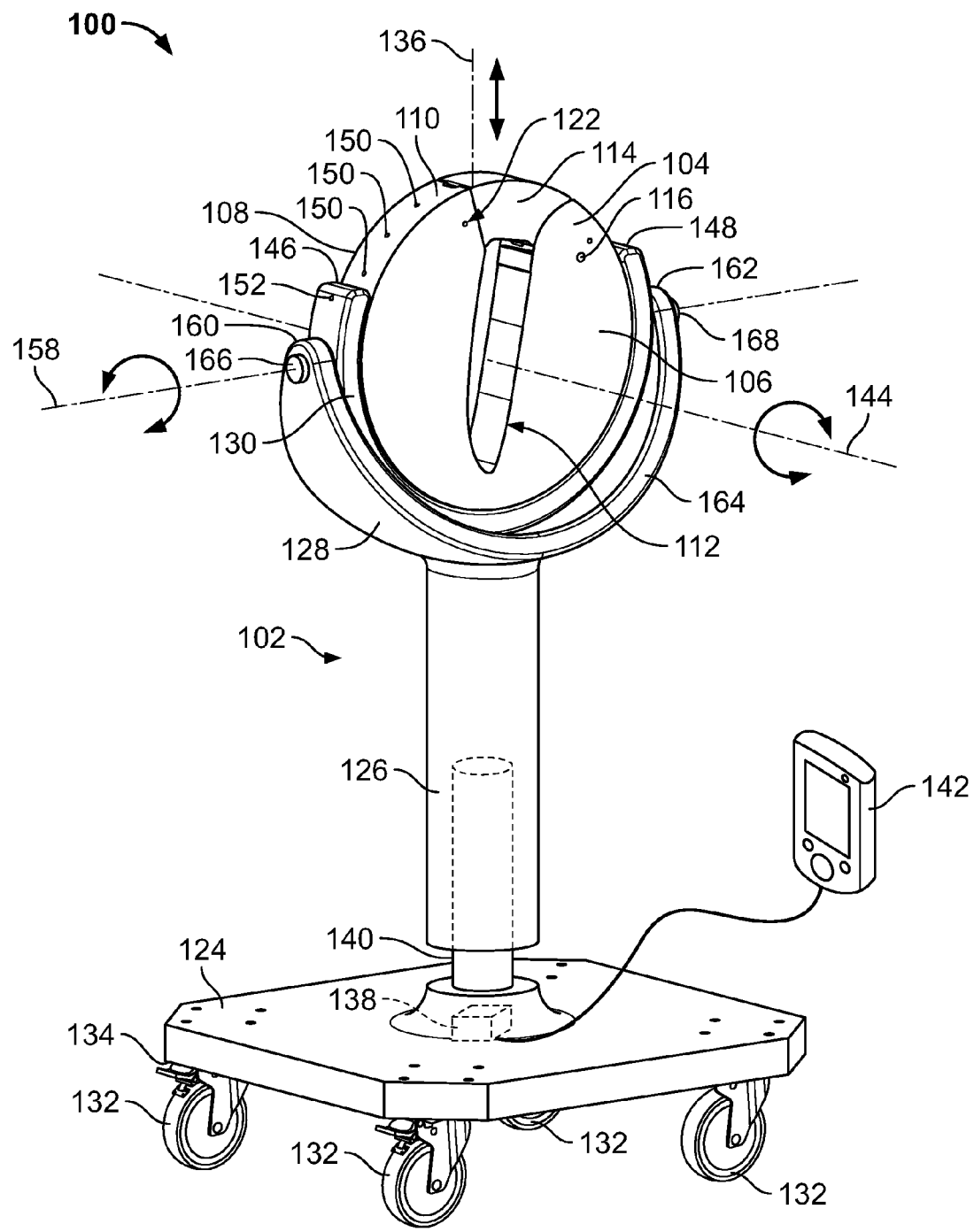
FIG. 1 is a perspective view of an example stand having an example blade support for supporting a component.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example stands or carts for supporting a part or component, such as a rotor blade of an aircraft. Example stands may be used to support a component during construction, maintenance and/or transportation of the component, for example. Example stands disclosed herein enable a rotor blade or other component to be orientated in multiple positions during manufacture. Before describing the example stands in detail, a brief description of the construction or manufacture of a composite rotor blade is provided below.

A hollow composite part, such as a rotor blade for a helicopter, is constructed by forming a composite material (e.g., fiberglass and epoxy/resin) around a mold. The part is then cured and the mold is pulled out from an opening in the end of the part. In some instances, because of design requirements, the opening is too small or obstructions are formed that prevent the mold from being removed in one piece. In these situations, specialty mold compounds are used that can be broken down inside the part so they can be extracted from the smaller opening. This type of scenario is known as trapped tooling. A washout process is used to loosen the mold compound. In particular, a washout tool that sprays liquid (e.g., water) through a jet is inserted into the opening and the liquid and mold compound mixture is drained out. To ensure all of the mold compound is removed from the composite rotor blade, the rotor blade is reoriented multiple times during the washout and drainage process so that the liquid can be sprayed throughout the entire interior of the composite shell. When constructing relatively large rotor blades, a washout and drainage process may take up to a day, for example.

During a washout process, one or more stands are used to support the composite rotor blade in a generally horizontal orientation. Two known types of stands exist: static stands and adjustable stands. These stands include a blade support that is disk-shaped and positioned in a vertical orientation. A slot or opening is provided in the disk to receive the rotor blade. Static stands do not provide the ability to rotate or move the rotor blade. Instead, to adjust the orientation of the rotor blade, the rotor blade is lifted via a crane, reoriented, and then lowered back onto the stands in the appropriate orientation. Known adjustable stands are designed for 180° rotation about a central axis of the blade support, which allows the blade support to rotate the rotor blade 180° about its longitudinal axis.

Example stands disclosed herein include a nest, cradle or, more generally, a blade support to hold a rotor blade (or other elongated part). The blade support provides full 360° rotation of the rotor blade about a central axis of the blade support (and, thus, a longitudinal axis of the rotor blade). The blade support may be shaped as a circular plate or disk, which is oriented generally vertically, and includes a centrally positioned opening extending from the peripheral edge of the blade support towards a center of the blade support. In some examples, the blade support includes a door that opens to provide a passage from the peripheral edge of the blade support to the opening to enable a part (e.g., a rotor blade) to be lowered into the opening of the blade support. Once a rotor blade is inserted into the opening, the door may be closed and locked. With the door closed, a substantially continuous or smooth outer edge or profile is formed around the blade support. The continuous outer edge of the blade support enables the blade support to rotate 360° within a collar or slewing ring around a central axis (e.g., a first axis) of the blade support.

In some examples, the blade support is rotatable about a horizontal tilt axis (e.g., a second axis), which is perpendicular to the central axis and extends through opposite edges of the disk. In particular, the blade support is rotatably coupled to a base via the slewing ring about the horizontal axis. As such, the blade support may be rotated or tilted to position the opening of the blade support (and, thus, the rotor blade) at an angle with respect to the ground or a supporting surface. As a result, when performing a washout process, the blade can be positioned to enable the mold compound to be washed and drained faster, thereby decreasing manufacturing time.

In some examples, the stand includes an actuator to adjust the height of the blade support (e.g., the distance of the blade support from the ground). For example, when two example stands are supporting a rotor blade, one (or both) of the stands may be raised or lowered. During the change in height, the blade supports of the example stands rotate about their respective horizontal tilt axes, under the weight of the rotor blade, to support the blade in a tilted or inclined orientation. In the horizontal position or the tilted position, the blade supports may be rotated about their respective central axes to rotate the rotor blade about its longitudinal axis. As such, the example stands enable a rotor blade or other component to be easily and quickly moved to other orientations, which enhances the ability to perform a washout/drainage process, for example. While the example stands disclosed herein are described in connection with supporting a rotor blade of an aircraft, it is understood that the example stands may be used to support any other component (e.g., a part, a work piece, an object, etc.) related or unrelated to the aircraft industry.

FIG. 1 illustrates an example cart or stand 100 constructed in accordance with the teachings of this disclosure. The example stand 100 may be used to transport and/or support a rotor blade. In the illustrated example, the stand 100 includes a base 102 and a blade support 104 (e.g., an adaptor disk, a contour disk, a nest, a cradle, a support ring, a captive ring) that is rotatably (e.g., pivotably, tiltably) coupled to the base 102. The base 102 supports the blade support 104 above a supporting surface (e.g., the ground). In the illustrated example, the blade support 104 is implemented as a circular plate or disk having a first side 106, a second side 108 opposite the first side 106, and peripheral edge 110 between the first and second sides 106, 108.

To receive a section of a rotor blade, the blade support 104 includes an opening 112 (e.g., a slot). In the illustrated example, the opening 112 extends from the edge 110 of the blade support 104 towards a center of the blade support 104. The opening 112 extends through the blade support 104 from the first side 106 to the second side 108. In the illustrated example, the opening 112 is shaped to receive a rotor blade (e.g., an airfoil) of an aircraft. However, in other examples, the opening 112 may be shaped differently to accommodate the profile of the object to be received by the opening 112.

Figure 2:
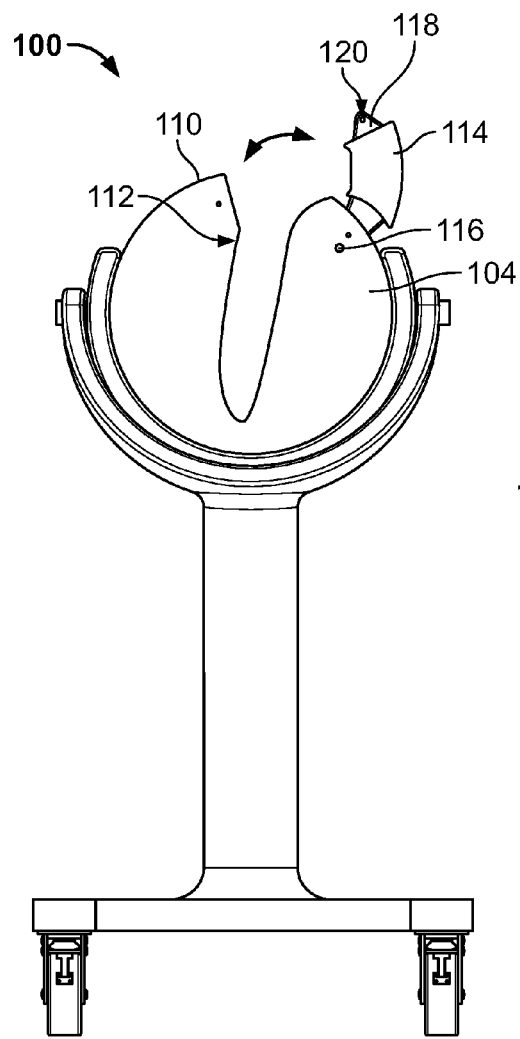
FIG. 2 is a front view of the example stand of FIG. 1 showing an example door of the example blade support in an open position.
Figure 3:
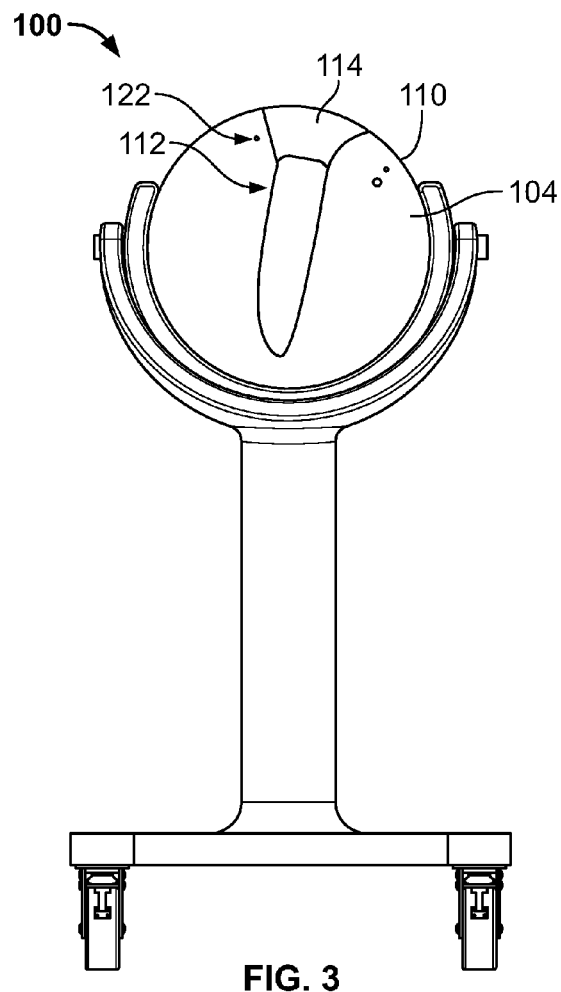
FIG. 3 is a front view of the example stand of FIGS. 1 and 2 showing the example door in a closed position.

To access the opening 112 (e.g., when inserting a rotor blade), the example blade support 104 includes a door 114 coupled to the edge 110 of the blade support 104 via a hinge 116 (e.g., a joint). The door 114 is moveable (e.g., rotatable or pivotable) between an open position, exposing the opening 112, and a closed position (and/or any other position therebetween). FIG. 2 is front view of the example stand 100 showing the door 114 in the open position. The door 114 may be rotated (e.g., about the hinge 116) to the open position to enable access to the opening 112 such as, for example, when inserting a rotor blade into the opening 112 or removing a rotor blade from the opening 112. FIG. 3 is a front view of the example stand 100 showing the door 114 in a closed position. FIG. 1 also illustrates the door 114 in the closed position. Once a rotor blade is inserted into the opening 112, the door 114 may be rotated to the closed position. As illustrated in FIGS. 1, 2 and 3, the door 114 is curved to match the curve along the edge 110 of the blade support 104. As such, when the door 114 is in the closed position, a substantially continuous or smooth circular edge is defined around the blade support 104. In some examples, the opening 112 of the blade support 104 may include padding (e.g., rubber, foam, etc.) to soften the interface between the rotor blade and the blade support 104.

In some examples, the door 114 may be locked in the closed position to lock or retain the rotor blade in the opening 112. For example, as illustrated in FIG. 2, the door 114 includes a tab 118 having a first locking hole 120. When in the closed position, as shown in FIGS. 1 and 3, the first locking hole 120 is aligned with a second locking hole 122 extending through the blade support 104. A pin (e.g., a plug, a bolt, etc.) may be inserted into the first and second locking holes 120, 122 to lock the door 114 in the closed position and, thus, capture the rotor blade within the blade support 104. In other examples, other types of latches, fasteners, etc. may be employed to lock the door 114 in the closed position. In some examples, the door 114 may be held in place by an interference fit (e.g., friction fit).

As illustrated in FIG. 1, the base 102 includes a base plate 124, a post 126 and a yoke 128 (e.g., a fork mount or open fork mount, a support, a collar). The blade support 104 is rotatably coupled to the base 102 (e.g., to the yoke 128) via a slewing ring 130 (e.g., a partial slewing ring, a slewing ring bearing, a bearing race, a locking ring, a pivot ring, a pivot yoke, a tilt yoke), discussed in further detail herein. In the illustrated example, a plurality of wheels 132 are coupled to a bottom 134 of the base plate 124. The wheels 132 enable the stand 100 to be moved (e.g., rolled across the ground) to transport a rotor blade, for example. In the illustrated example, the wheels 132 are lockable to prevent the stand 100 from moving, when desired. In the illustrated example, the stand 100 includes four wheels 132. However, in other examples, the stand 100 may be employ more or fewer wheels (e.g., two wheels, seven wheels, etc.).

In the illustrated example, the post 126 is moveably coupled to the base plate 124. In particular, the post 126 is movable along a vertical axis 136 to raise or lower the blade support 104 and, thus, a rotor blade held therein. To move the post 126 (and, thus, the blade support 104) along the vertical axis 136, the example stand 100 includes an actuator 138. The actuator 138 moves the post 126 along a rod 140, disposed within the post 126. In the illustrated example, a controller 142 is provided to control the actuator 138 (e.g., to move the post 126 up or down along the rod 140). The actuator 138 may be any type of linear or rotary actuator (e.g., a screw drive) such as, for example, a hydraulic actuator, an electric actuator, a mechanical actuator, an electro-mechanical actuator, a piezoelectroic actuator or any other suitable actuator or drive member. In the illustrated example, the actuator 138 is coupled to the base plate 124. In other examples, the actuator 138 may be disposed elsewhere (e.g., within the post 126). In some examples, a lock or stop is provided to lock the post 126 at a desired height. In other examples, the post 126 may be manually operated or actuated to move up and down. In the illustrated example, the blade support 104 is supported by one post. However, in other examples, multiple posts may be coupled between the base plate 124 and the yoke 128, for example.

Figure 4:
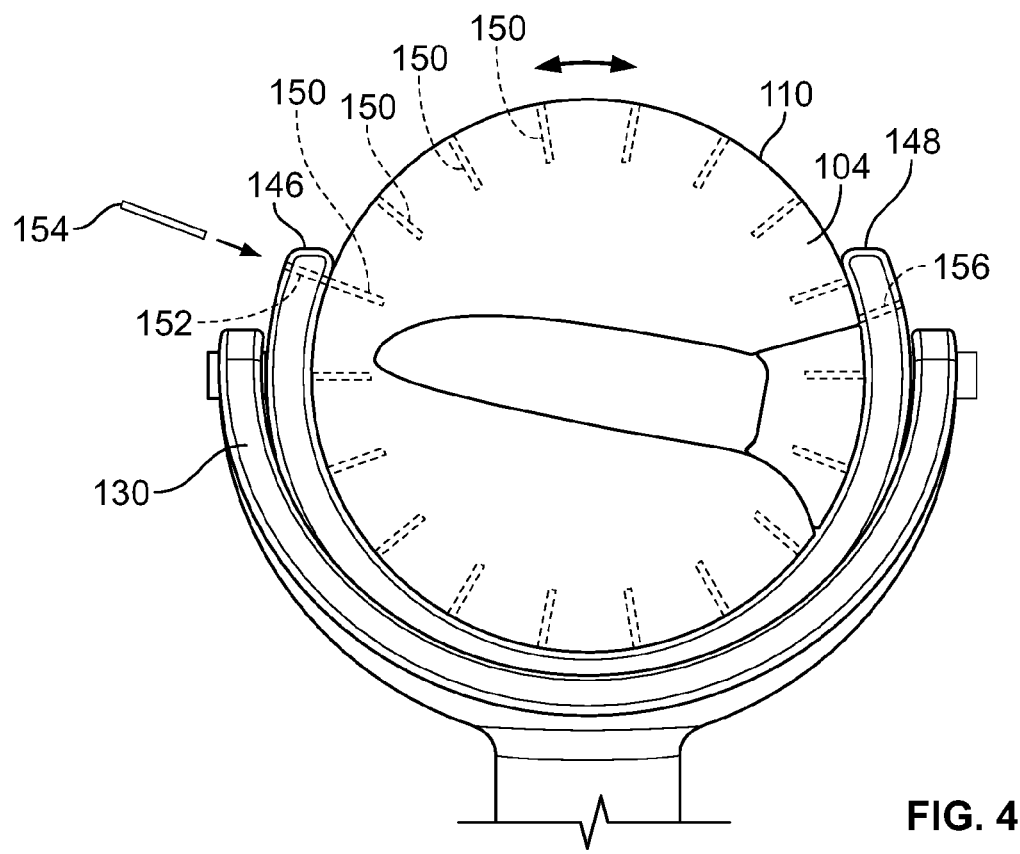
FIG. 4 is a front view of the example blade support of FIG. 1 in a rotated position.

In the illustrated example, the blade support 104 is rotatable about a central axis 144 (e.g., a first axis) of the blade support 104. As a result, when a rotor blade is supported by the blade support 104 (e.g., in a horizontal orientation), the blade support 104 may rotate the rotor blade about its longitudinal axis. FIG. 4 shows the blade support 104 after being rotated. To enable the blade support 104 to rotate about the central axis 144, the blade support 104 is rotatably coupled to the slewing ring 130, which functions as a bearing race. In the illustrated example, the slewing ring 130 is an arc-shaped or c-shaped rail that is curved to correspond to the radius of curvature of the blade support 104. The slewing ring 130, which may hold ball or needle bearings, receives at least a portion of the edge 110 of the blade support 104, which enables the edge 110 of the blade support 104 to slide within the slewing ring 130 and, thus, rotate about the central axis 144. The blade support 104 may be rotated 360° about the central axis 144 (FIG. 1). As illustrated in FIGS. 1 and 4, the slewing ring 130 has a first end 146 and a second end 148 opposite the first end 146. The slewing ring 130 forms a curve greater than 180° (e.g., greater than a half circle), thereby preventing the blade support 104 from being removed from the slewing ring 130.

In some examples, the blade support 104 may be locked to prevent rotation about the central axis 144. As illustrated in FIGS. 1 and 4, the blade support 104 includes a plurality of position holes 150 (e.g., apertures, bores, openings, etc.) formed in and spaced radially around the edge 110 of the blade support 104. The slewing ring 130 includes a first lock hole 152 near the first end 146 of the slewing ring 130 that is radially aligned with a center of the blade support 104. The blade support 104 may be rotated to align one of the position holes 150 with the first lock hole 152 in the slewing ring 130 and a pin 154 (e.g., a T-pin, a plug, a bolt) (FIG. 4) may be inserted into the first lock hole 152 and the corresponding position hole 150 in the blade support 104 to lock the blade support 104 in a desired position. The blade support 104 may be rotated to align any of the position holes 150 with the first lock hole 152, and the pin 154 may be inserted into the first lock hole 152 to lock the blade support 104 in place.

As illustrated in FIG. 4, the position holes 150 are spaced evenly around the edge 110 of the blade support 104. In other examples, the blade support 104 may include more or fewer position holes, which may be spaced evenly or unevenly around the edge 110 of the blade support 104. In some examples, the position holes 150 are unevenly spaced apart and/or sequenced in a particular arrangement for a complex washout process. For example, the inside of a composite rotor blade may include intricate pockets or channels that may require the rotor blade to rotated back-and-forth when washing to ensure all of the mold compound is removed. As such, the blade support 104 may include a particular sequence of position holes spaced appropriately so that the blade support 104 can be rotated (e.g., back-and-forth) in a predetermined patterned or sequence to ensure adequate washing is achieved.

In some examples, to provide more locking positions without the need for additional positions holes in the blade support 104, the slewing ring 130 includes a second lock hole 156 (FIG. 4). As illustrated in FIG. 4, the second lock hole 156 is located near the second end 148 of the slewing ring 130. In the illustrated example, the angular difference between the first lock hole 152 and the second lock hole 156 may be offset or staggered from the angular increment or spacing (e.g., 20°) between the positions holes 150. For example, when the first lock hole 152 is aligned with one of the position holes 150, as illustrated in FIG. 4, the second lock hole 156 is not aligned with one of the position holes 150, and vice versa. Instead, when the first lock hole 152 is aligned with one of the position holes 150, the second lock hole 156 is located between two of the position holes 150. The blade support 104 may be rotated to a position where one of the position holes 150 is aligned with the second lock hole 156 (and a pin (e.g., similar to the pin 154) may be inserted into the second lock hole 156), in which case none of the position holes 150 is aligned with the first lock hole 152. For example, in the illustrated example of FIG. 4, the blade support 104 includes eighteen (18) position holes 150 spaced evenly (i.e., every 20°) around the edge 110 of the blade support 104. Therefore, the first lock hole 152 can be aligned with one of the position holes 150 every 20°. However, by offsetting the second lock hole 156 (e.g., by 10°) from a corresponding one of the position holes 150, the second lock hole 156 can be used to lock the blade support 104 in positions between that of the first lock hole 152, thereby enabling the blade support 104 to be locked at thirty-six positions (e.g., every 10°) instead of eighteen positions. In other examples, the second lock hole 156 may be positioned such that it aligns with one of the position holes 150 when the first lock hole 152 is aligned with one of the position holes 150 (e.g., to supplement the locking force). In the illustrated example, the position holes 150 are also formed on the door 114. In other examples, no position holes may be formed on the door 114.

Figure 5:
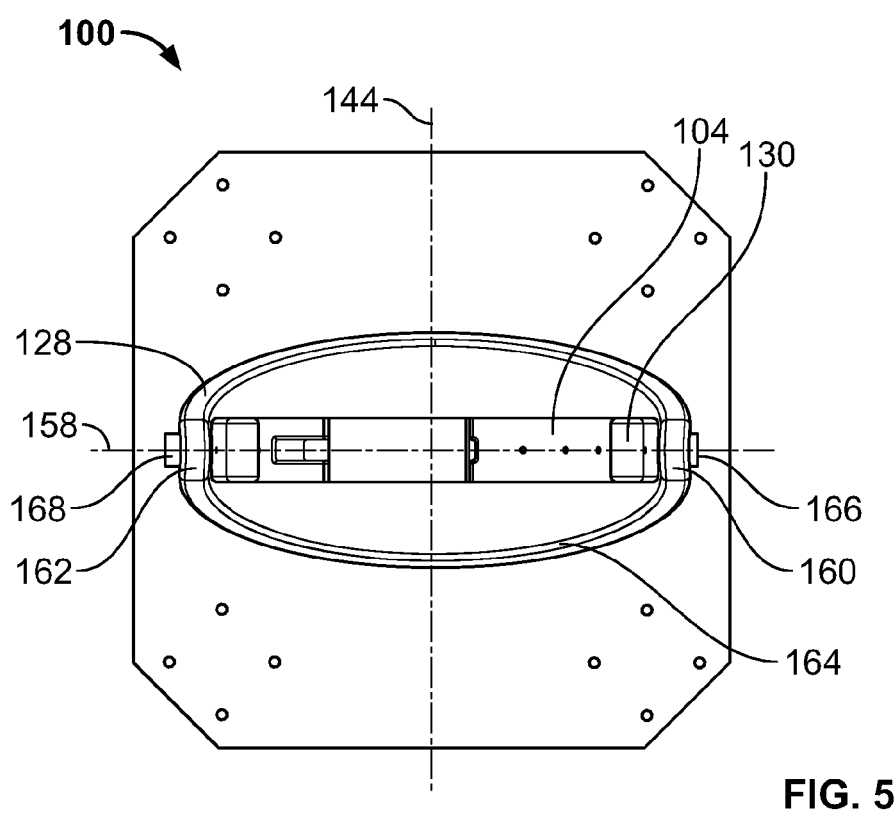
FIG. 5 is a top view of the example stand of FIG. 1.

Referring back to FIG. 1, the example blade support 104 is rotatable about a horizontal tilt axis 158 (e.g., a horizontal axis), which is perpendicular to the central axis 144 and to the vertical axis 136. As a result, the blade support 104 can tilt (e.g., angle, incline) a rotor blade relative to the ground or supporting surface (e.g., relative to a horizontal axis). The horizontal tilt axis 158 is also perpendicular to the vertical axis 136. FIG. 5 is a top view of the example stand 100 showing the central axis 144 and the horizontal tilt axis 158. As illustrated in FIGS. 1 and 5, to enable the blade support 104 to rotate about the horizontal tilt axis 158, the slewing ring 130 is rotatably (e.g., pivotably) coupled to the yoke 128 about the horizontal tilt axis 158. In the illustrated example, the yoke 128 has a first end 160, a second end 162 and a middle section 164 between the first and second ends 160, 162 that define a generally c-shaped structure. The slewing ring 130 is rotatably coupled to the yoke 128 via a first joint 166 near the first end 160 of the yoke 128 and a second joint 168 near the second end 162 of the yoke 128. The first and second joints 164, 166 define the horizontal tilt axis 158 that enables the slewing ring 130 (and, thus, the blade support 104) to rotate about the horizontal tilt axis 158.

Figure 6:
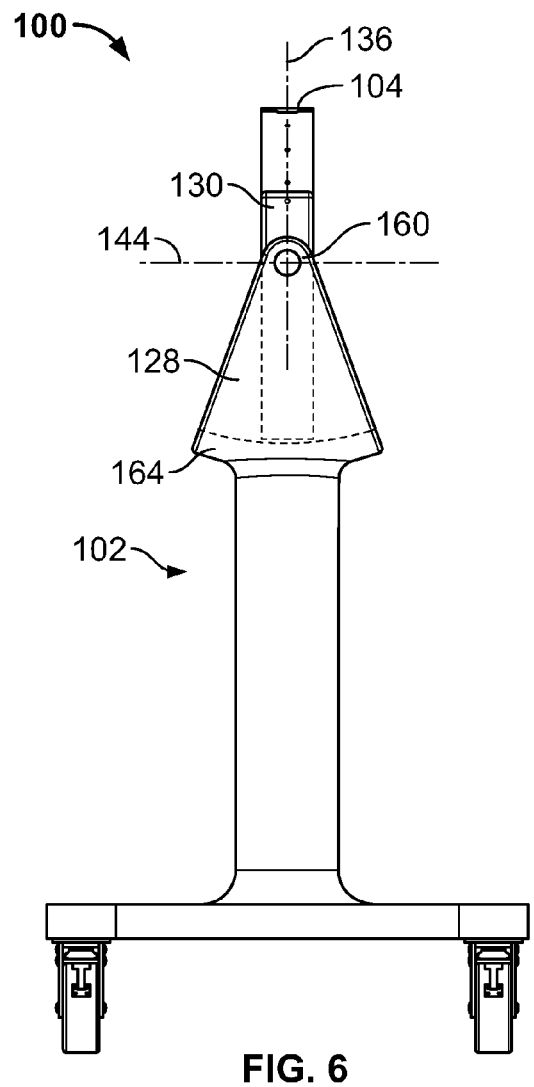
FIG. 6 is a side view of the example stand of FIG. 1 showing the example blade support in a vertical position.
Figure 7:
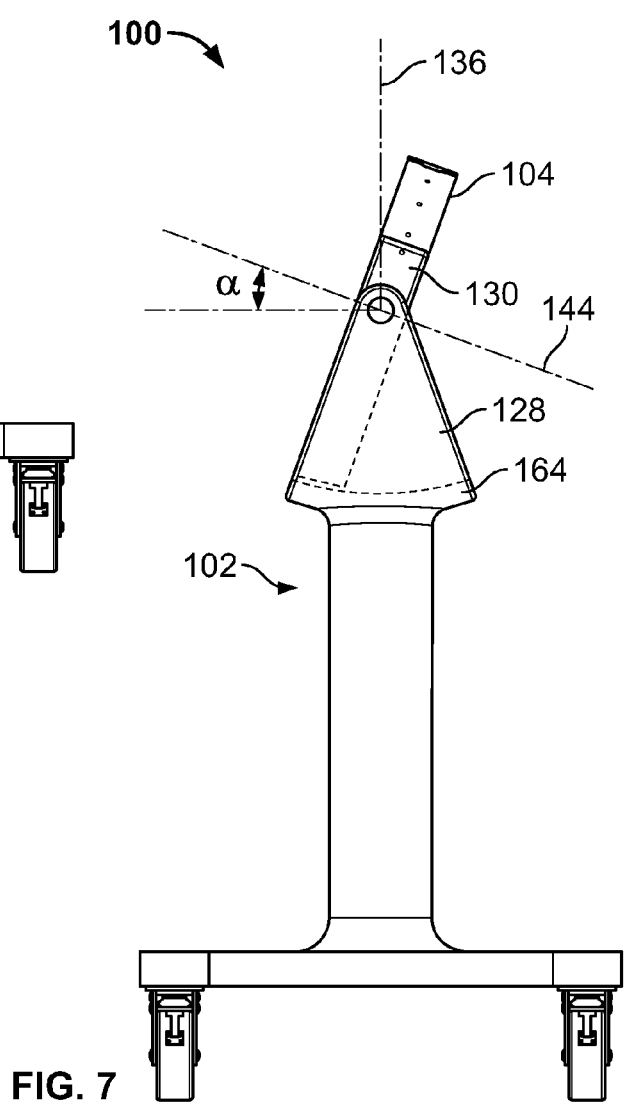
FIG. 7 is a side view of the example stand of FIG. 1 showing the example blade support in a tilted or inclined position.

FIG. 6 is a side view of the example stand 100 showing the slewing ring 130 and the blade support 104 in a vertical orientation (e.g., a first position). In the illustrated example, the central axis 144 of the blade support 104 is horizontal (e.g., coincident with a horizontal axis). FIG. 7 is a side view of the example stand 100 showing the slewing ring 130 and blade support 104 rotated about the horizontal tilt axis 158 (FIGS. 1 and 5) (e.g., in a second position). In the position shown in FIG. 7, the central axis 144 of the blade support 104 is at an angle α with respect to a horizontal axis (e.g., relative to the ground) and, thus, the central axis 144 is not horizontal. The slewing ring 130 and blade support 104 may be rotated in either direction about the horizontal tilt axis 158 and to any angle. In other words, the blade support 104 is moveable between a first position (FIG. 6), in which the blade support 104 is oriented generally vertical such that the central axis 144 is horizontal (e.g., α=0°), and a second position (FIG. 7), in which the blade support 104 is tilted or inclined such that the central axis 144 is angled with respect to a horizontal axis or the ground (e.g., α=8°). In the first position or vertical orientation, as shown in FIG. 6, the central axis 144 is perpendicular to the vertical axis 136. However, in the second position or tilted orientation, the central axis 144 is not perpendicular to the vertical axis 136. In either the first position (FIG. 6) or the second position (FIG. 7), the blade support 104 may be rotated about the central axis 144. In some examples, the blade support 104 may be simultaneously rotated about the central axis 144 and the horizontal tilt axis 158 (FIG. 1).

As illustrated in FIGS. 1, 6 and 7, the yoke 128 is flared to be wider or angled near the middle section 164 (e.g., wider than the blade support 104 and/or slewing ring 130). The example flared section prevents objects (e.g., fingers) from being pinched between the yoke 128 and the slewing ring 130. In other examples, the middle section 164 of the yoke 128 may be wider or narrower. In some examples, one or more stops are provide on the base 102 (e.g., on the middle section 164 of the yoke 128) to prevent the slewing ring 130 and/or the blade support 104 from rotating past a maximum limit (e.g., ±8°).

Figure 8:
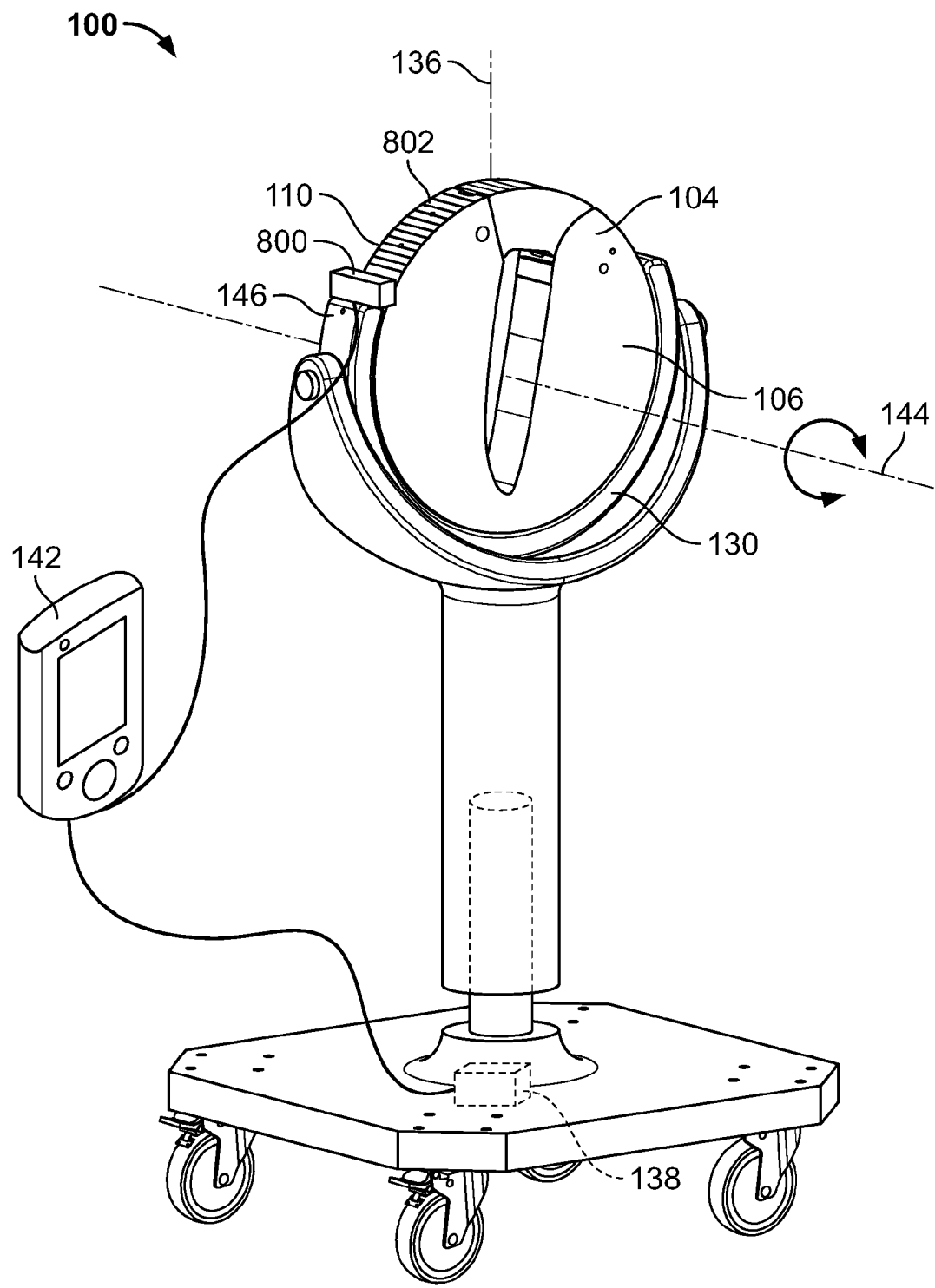
FIG. 8 is a perspective of the example stand of FIG. 1 having an example actuator for rotating the example blade support about a central axis of the example blade support.

In some examples, the stand 100 includes a motor or actuator to rotate the blade support 104 about the central axis 144. FIG. 8 illustrates the example stand 100 having an actuator 800. The actuator 800 rotates the blade support 104 in either direction about the central axis 144. In the illustrated example, the actuator 800 is coupled to the first end 146 of the slewing ring 130 and engages the edge 110 of the blade support 104, which includes a plurality of teeth 802 (e.g., grooves, ribs, etc). The actuator 800 includes a gear (e.g., a pinion, a sprocket, etc.) to mesh with the teeth 802 on the blade support 104. In other examples, other types of actuators and/or arrangements may be implemented to automatically rotate the blade support 104. For example, a plurality teeth may be provided on the first side 106 of the blade support 104 near the edge 110 of the blade support, and the actuator 800 may engage the teeth on the first side 106 to rotate the blade support 104. In some examples, the actuator 138 for moving the blade support 104 along the vertical axis 136 and the actuator 800 for rotating the blade support 104 about the central axis 144 are controlled by the controller 142. In other examples, a separate controller may be provided for each of the actuators 138, 800.

Figure 9:
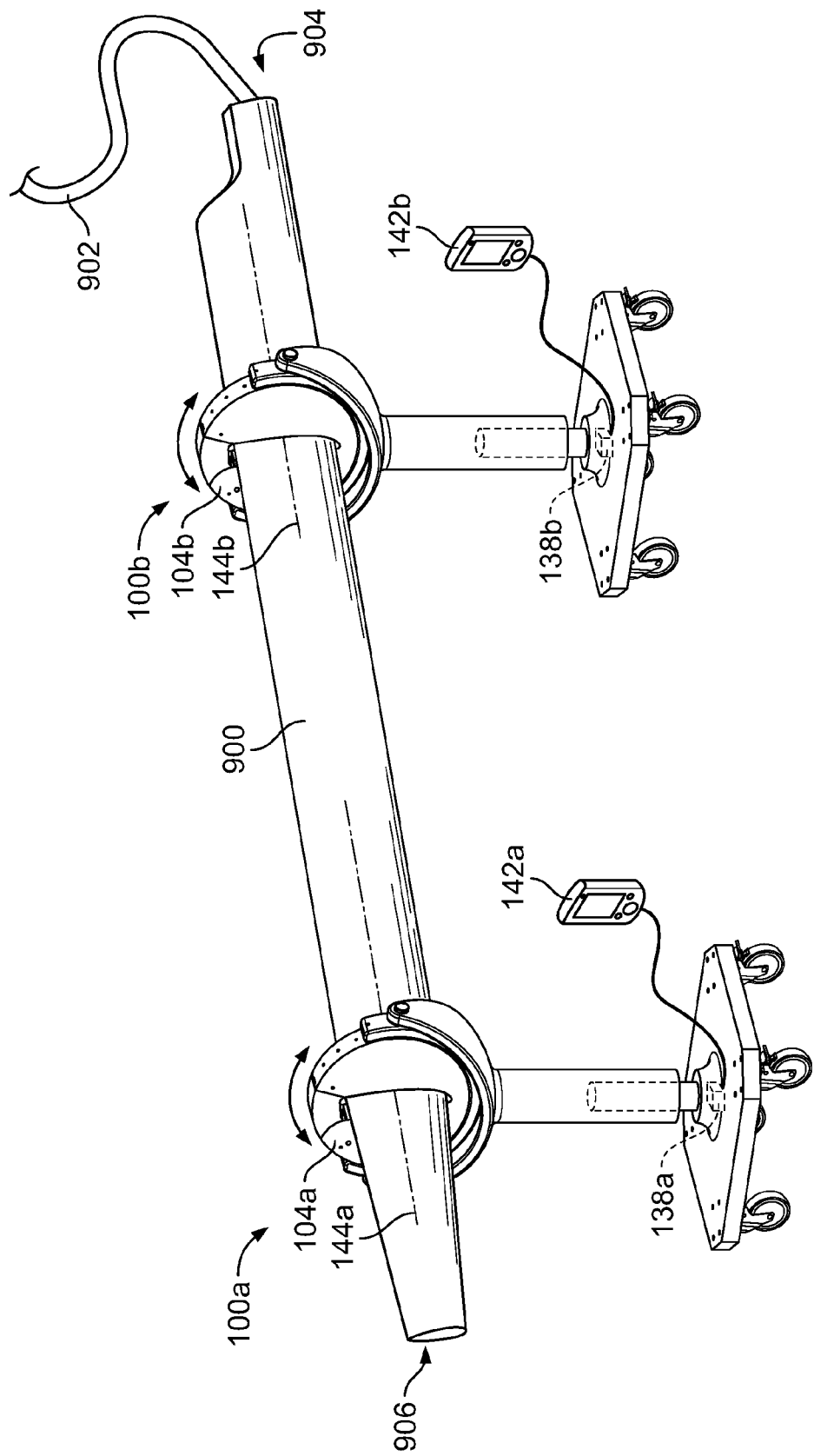
FIG. 9 illustrates two example stands supporting an example rotor blade in a generally horizontal orientation.

FIG. 9 shows an example rotor blade 900 supported by a first example stand 100a and a second example stand 100b. In the illustrated example, the first and second stands 100a, 100b correspond to the stand 100 of FIGS. 1-8. To avoid redundancy, the elements of the first and second stands 100a, 100b have been labeled according to the example stand 100 from FIGS. 1-8. The corresponding components of the first stand 100a have been labeled with "a" and the corresponding components of the second stand 100b have been labeled with "b."

As illustrated in FIG. 9, the first and second stands 100a, 100b are at the same relative height and, thus, support the rotor blade 900 in a substantially horizontal orientation. The first and second stands 100a, 100b may be used to transport the rotor blade 900 (e.g., via the wheels) and/or support the rotor blade 900 during manufacturing, maintenance, etc. As disclosed herein, in some examples, a rotor blade is constructed by forming composite material around a mold. After the composite material is hardened, the inner mold is removed by a washout process. In particular, to remove the mold, a tool 902 having a jet for spraying fluid is inserted into a first end 904 of the rotor blade 900. The tool 902 sprays liquid around the inside of the rotor blade 900 to loosen the mold compound. The mold compound and fluid mixture is drained from a second end 906 of the rotor blade 900 opposite the first end 904. During this washout process, it is often desired to rotate the rotor blade 900 about its longitudinal axis and/or tilt the rotor blade 900 to ensure all of the mold compound is loosened and then drained from inside of the rotor blade 900. As disclosed herein, the first blade support 104a of the first stand 100a and the second blade support 104 of the second stand 100b may be rotated about their respective central axes 144a, 144b to rotate the rotor blade 900 about its longitudinal axis. To tilt or angle the rotor blade 900 with respect to the ground, the height of the first stand 100a and/or the second stand 100b may be altered. For example, the first actuator 138a of the first stand 100a may be actuated to move the first blade support 104a up or down (e.g., via the first controller 142a) and/or the second actuator 138b of the second stand 100b may be actuated to move the second blade support 104b up or down (e.g., via the second controller 142b). In some examples, one controller may be provided to independently or simultaneously control the first actuator 138a and the second actuator 138b.

Figure 10:
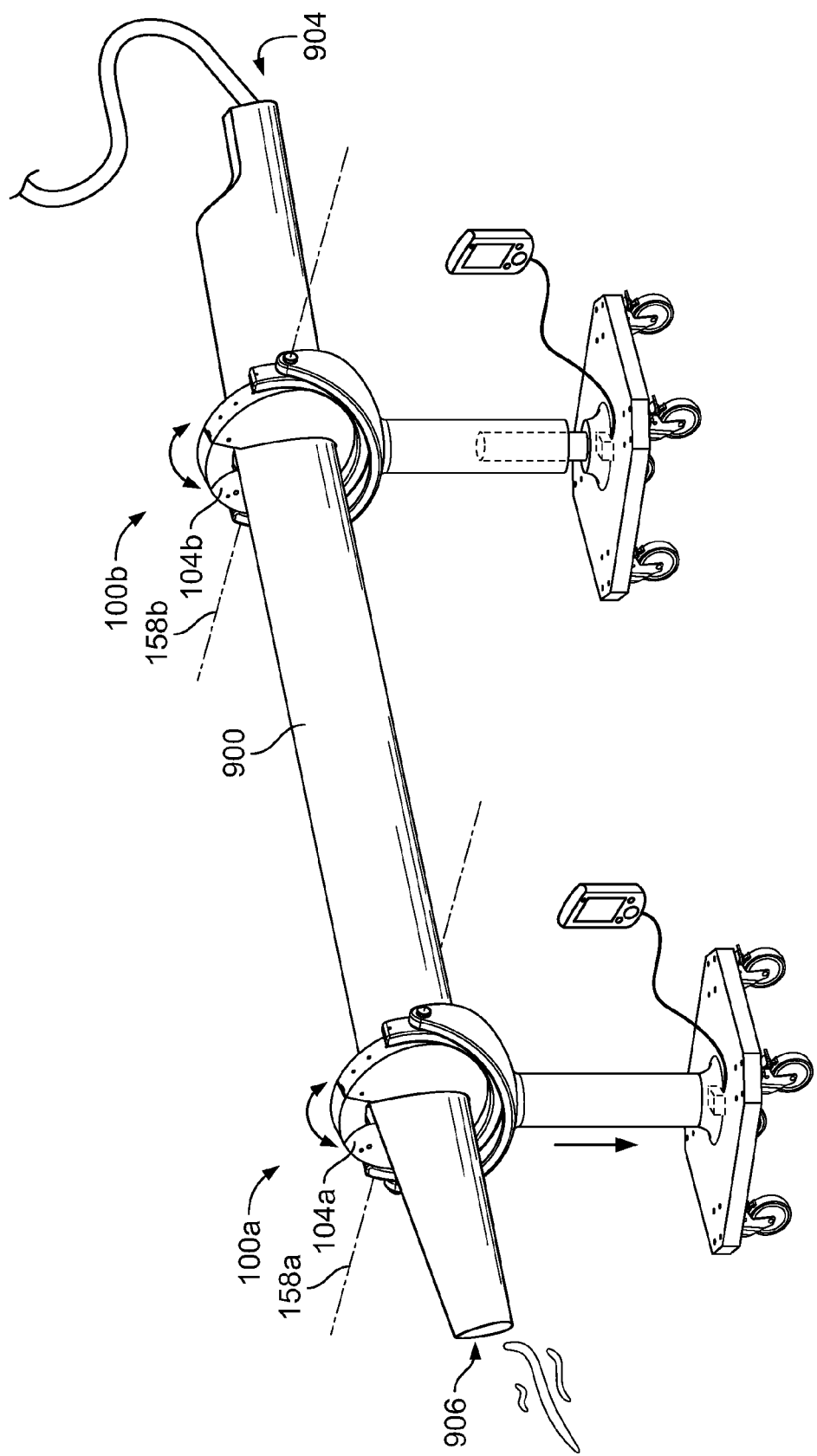
FIG. 10 illustrates the two example stands of FIG. 9 supporting the example rotor blade in a tilted or inclined orientation.

FIG. 10 shows an example of when the first blade support 104a of the first stand 100a is positioned lower (e.g., closer to the ground) than the second blade support 104b of the second stand 100b. As the first blade support 104a is lowered (and/or the second blade support 104b is raised), the first blade support 104a rotates about the first horizontal tilt axis 158a and the second blade support 104b rotates about the second horizontal tilt axis 158b to allow the rotor blade 900 to tilt or incline with respect to the ground (e.g., or a horizontal axis). In some examples, the first and second blade supports 104a, 104b rotate without any motors or actuators. In other words, the first and second blade supports 104a, 104b are free to swivel or rotate about the respective horizontal tilt axes 158a, 158b under the weight of the rotor blade 900. The first and second stands 100a, 100b enable the rotor blade 900 to be angled downward (e.g., where the second end 906 is lower than the first end 904), thereby facilitating the drainage of the fluid and/or mold compound from the inside of the composite material of the rotor blade 900. As a result, the washout and/or drainage processes can be performed faster and more effectively than with known stands and cranes.

In the illustrated example of FIGS. 9 and 10, only two example stands are used. However, in other examples, more than two stands may be used to support a rotor blade. For example, four stands may be used to support a rotor blade, and the stands may operate as disclosed herein.

From the foregoing, it will be appreciated that the above disclosed stands enable a rotor blade or other component (e.g., a part, a work piece, etc.) supported by the stands to be rotated about multiple axes. The example stands disclosed herein reduce or eliminate the need for cranes and/or other devices to be used to reorient the rotor blade and, thus, enable faster washing and draining operations. Further, the example stands significantly increase the safety of a washout operation, for example, by fully retaining the rotor blade. The example stands also increase safety by eliminating the need to work on a component while suspended by a crane. Additionally, the example stands allow for the preferred orientation of the component to be achieved with reduced physical effort, as compared to known stands. Further, less stress is placed on a component with the example stands in a tilted position than could be accomplished by using the known stands.

Although certain apparatus and articles of manufacture have been disclosed herein, the scope of coverage of this patent is not limited thereto. On the contrary, this patent covers all apparatus and articles of manufacture fairly falling within the scope of the claims of this patent.

What is claimed is:

1. An apparatus comprising:
a blade support having an opening extending from an edge of the blade support towards a center of the blade support, the opening to receive a rotor blade of an aircraft; and
a base to support the blade support above a supporting surface, the blade support rotatably coupled to the base about a horizontal axis perpendicular to a central axis of the blade support such that the blade support can tilt the rotor blade relative to the supporting surface, wherein the blade support is rotatable about the central axis to rotate the rotor blade about a longitudinal axis of the rotor blade, and wherein the blade support is rotatably coupled to the base via a slewing ring, the slewing ring to receive at least a portion of the edge of the blade support, the edge of the blade support slidable along the slewing ring to rotate the blade support about the central axis.

2. The apparatus of claim 1, wherein the base includes a post that is moveable along a vertical axis to raise or lower the blade support.

3. The apparatus of claim 2, further including an actuator to move the post along the vertical axis.

4. The apparatus of claim 1, wherein the base includes a yoke, the slewing ring rotatably coupled to the yoke about the horizontal axis.

5. The apparatus of claim 4, wherein a middle section of the yoke is wider than the blade support.

6. The apparatus of claim 1, wherein the blade support includes a plurality of position holes formed in and spaced radially around the edge of the blade support, and the slewing ring includes a lock hole, further including a pin to be inserted into the lock hole and one of the plurality of position holes in the edge of the blade support to lock the blade support in a desired position.

7. The apparatus of claim 1, further including a door hingeably coupled to the blade support, the door moveable between an open position, exposing the opening, and a closed position, forming a substantially continuous edge around the blade support.

8. The apparatus of claim 1, further including an actuator to rotate the blade support about the central axis.

9. An apparatus comprising:
a base; and
a blade support pivotably coupled to a base, the blade support including an opening to receive a rotor blade of an aircraft, the blade support pivotable between a first position in which a central axis of the blade support is horizontal and a second position in which the central axis is not horizontal, wherein the blade support is rotatably coupled to the base via a slewing ring that receives at least a portion of an edge of the blade support, the edge of the blade support slidable along the slewing ring to rotate the blade support about the central axis.

10. The apparatus of claim 9, wherein, in the first position or the second position, the blade support is rotatable about the central axis.

11. The apparatus of claim 9, wherein the blade support is pivotably coupled to the base about a horizontal tilt axis, the horizontal tilt axis perpendicular to the central axis.

12. The apparatus of claim 11, wherein the base includes a post to move the blade support along a vertical axis, the horizontal tilt axis perpendicular to the vertical axis.

13. The apparatus of claim 12, wherein the central axis is perpendicular to the vertical axis in the first position and the central axis is not perpendicular to the vertical axis in the second position.

14. The apparatus of claim 9, further including a door hingeably coupled to the blade support, the door moveable between an open position, exposing the opening, and a closed position, forming a substantially continuous edge around the blade support.

15. An apparatus comprising:
a base;
a blade support having an opening extending from an edge of blade support towards a center of the blade support, the opening to receive an object to be supported by the blade support;
means for rotatably coupling the blade support to the base about a horizontal axis perpendicular to a central axis of the blade support, the means for rotatably coupling including means for rotating the blade support 360° about the central axis; and
means for locking the object in the opening.

16. The apparatus of claim 15, further including means for moving the blade support along a vertical axis.

* * * * *